United States Patent [19]

Mizoguchi

[11] Patent Number: 4,818,159

[45] **Date of Patent: * Apr. 4, 1989**

[54] CUTTING TOOL HOLDER WITH OIL HOLES

[75] Inventor: Sutemaru Mizoguchi, Ikoma, Japan

[73] Assignee: Mizoguchi Iron Works & Co., Ltd., Ikoma, Japan

[ * ] Notice: The portion of the term of this patent subsequent to Mar. 24, 2004 has been disclaimed.

[21] Appl. No.: 903,927

[22] Filed: Sep. 5, 1986

Related U.S. Application Data

[62] Division of Ser. No. 578,717, Feb. 9, 1984, Pat. No. 4,652,189.

[30] Foreign Application Priority Data

Apr. 28, 1983 [JP] Japan .................................. 58-66115

[51] Int. Cl.⁴ .......................... B23C 5/28; B23Q 11/10

[52] U.S. Cl. ....................................... 409/136; 279/20; 408/56; 408/59; 408/239

[58] Field of Search ........................ 408/56, 57, 58, 59, 408/60, 61; 279/20; 409/135, 136

[56] References Cited

U.S. PATENT DOCUMENTS

| | | | |
|---|---|---|---|
| 1,962,152 | 6/1934 | Peterson | 29/23.5 |
| 2,780,966 | 2/1957 | Frost et al. | 409/135 |
| 3,781,024 | 12/1973 | Ganser et al. | 408/59 X |
| 4,598,617 | 7/1986 | Kubo et al. | 279/20 X |

FOREIGN PATENT DOCUMENTS

| | | | |
|---|---|---|---|
| 1126390 | 11/1984 | U.S.S.R. | 408/56 |

*Primary Examiner*—Z. R. Bilinsky
*Attorney, Agent, or Firm*—Armstrong, Nikaido, Marmelstein & Kubovcik

[57] ABSTRACT

A holder for a cutting tool has a main spindle formed with a bore to receive the cutting tool, a casing mounted on the main spindle, and an oil receiver stand secured to the casing. The main spindle, casing and receiver stand are each formed with an oil passage communicating with one another to feed cutting fluid to the cutting tool. The holder is characterized in that an intensifier for increasing the feed pressure of the cutting fluid is provided in an annular chamber provided around the main spindle in the oil passage to the cutting tool.

2 Claims, 3 Drawing Sheets

12 30 42 41 44 A 14 42 10 9 22 33 21 20 25 43 26 16 17

29
8
14
10
25
15
27
16
26
24
27
28
23

14
33
8
10
A
21
22
20
19
16
17
7
4
24

12
30
33
10
A

10
A
33

12
30
42
41
44
A
14
42
10
9
22
33
21
20
25
43
26
16
17

14
44
41
10
21
20
43

8
34
A
10
21
37
36
35
20

21
10
A
38
40
20
39

CUTTING TOOL HOLDER WITH OIL HOLES

This is a division of application Ser. No. 578,717 filed Feb. 9, 1984, now U.S. Pat. No. 4,652,189.

The present invention relates to a cutting tool holder formed with an oil hole.

It is a common practice to perform machining while feeding cutting oil to the lip of a cutting tool such as a drill, in order to minimize frictional heat generated during machining. This is carried out by mounting on a holder a drill with an oil hole and feeding cutting oil through the oil hole while the drill is revolving.

Known from Japanese Utility Model Publication No. 55-15946 is an arrangement in which a cutting tool formed with an oil hole is set in a cutting tool holder, the holder with a cutting tool being mounted on the spindle, and the cutting tool is fed with cutting oil from the spindle frame through the holder. In the known arrangement, an oil feed stand is provided on the spindle frame and a receiver stand is provided on the holder. When the holder with the cutting tool is mounted on the spindle, the tip of a hollow pin on the receiver stand fits in a recess in the feed stand which communicates with an oil feed passage. Simultaneously the hollow pin is pushed back so that a stopper extending from the hollow pin will get out of a notch formed in the holder. At the same time when the holder starts to rotate with the spindle, a coolant pump is actuated to feed cutting oil from the feed stand through the hollow pin, the receiver stand, the main spindle chuck to the tip of the cutting tool.

The improvement made on cutting tools in recent years has made possible high speed cutting. The spindle is revolved at a higher speed than before. In view of this trend, an ordinary coolant pump has too low a delivery pressure to minimize the frictional heat generated during machining and to assure good lubrication between the cutting tool and the material being cut and good ejection of chip.

Since the known arrangement is such that the cutting oil is adapted to flow through a radial oil hole and then an axial oil hole both in the main spindle, a centrifugal force acts on the cutting oil, decreasing the pressure at which it is supplied. The higher the spindle speed, the more remarkable this tendency is. During high-speed run, the cutting oil is not sufficiently supplied.

This necessitates the replacement of a coolant pump and associated piping which is expensive. Also, this is one of the causes of delay in the popularization of cutting tools with an oil hole.

It is an object of the present invention to provide a cutting tool holder which eliminates the above-described disadvantage.

In accordance with the present invention, an intensifier, which takes advantage of the revolution of the main spindle to raise the feed pressure of the cutting oil, is provided in the course of the cutting oil feed line passing through the cutting tool holder.

With the above-mentioned object in view and as will become apparent from the following detailed description, the present invention will be more clearly understood in connection with the accompanying drawings, in which.

Figure 1:
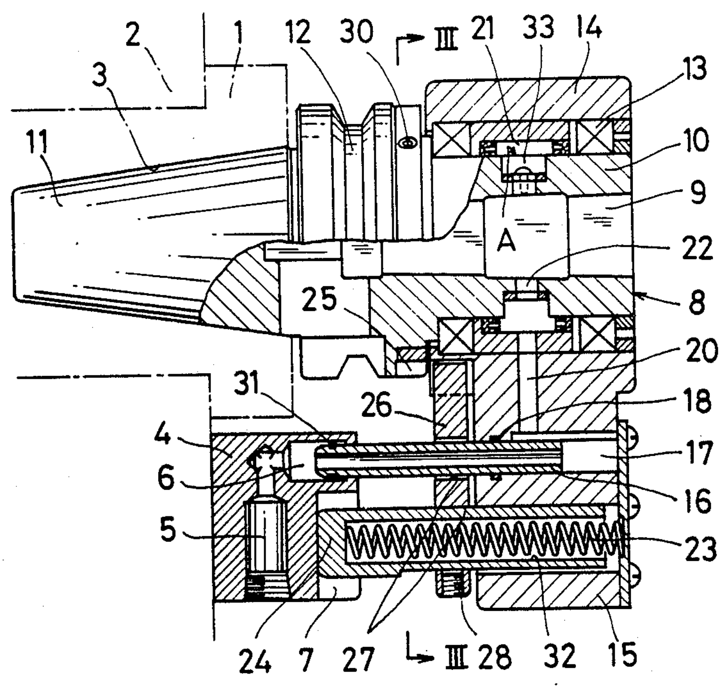
FIG. 1 is a partially cutaway front view of an embodiment of the present invention.
Figure 2:
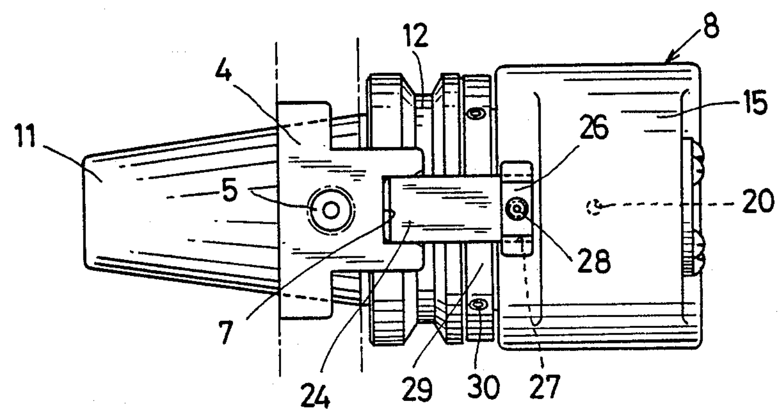
FIG. 2 is a bottom view thereof.

Referring to the drawings, a spindle 1 rotatably supported on a frame 2 is provided with a tapered hole 3 in its one end. An oil feed stand 4 is secured to the end face of the frame 2 in the proximity of the spindle 1 by means of screws or the like. A mouth 6 and a recess 7 are provided in the end face of the feed stand 4, the former being disposed above the latter. The mouth 6 communicates with a feed passage 5 through which oil or other cutting fluid is fed. A hose (not shown) connects the feed passage 5 to a pump (not shown).

A cutting tool holder 8 comprises a main spindle 10 formed with a bore 9 in one end thereof to receive a cutting tool, and a shank 11 connected to the other end of the main spindle 10 and adapted to fit in the tapered hole 3. An annular groove 12 is formed in the same end of the main spindle 10 so as to be grasped by a manipulator (not shown). The main spindle 10 is journalled in a casing 14 by a bearing 13 so as to rotate freely.

A receiver stand 15 is provided on the outer periphery of the casing 14 so as to face the oil feed stand 4. One end of a feed pipe 16 is secured to the receiver stand 15. When the cutting tool holder 8 is mounted on the spindle 1, the other end of the feed pipe 16 fits in the mouth 6.

In the embodiment shown, one end of the feed pipe 16 is received in a hole 17 provided in the receiver stand 15. An O ring 18 is used to prevent oil leakage. A screw 19 is screwed into the receiver stand 15 so that its inner end is pressed against the feed pipe 16 to secure it. Because of this arrangement, the length of the projecting portion of the feed pipe 16 can be adjusted according to the distance between the feed stand 4 and the receiver stand 15 when the cutting tool holder 8 is mounted on the spindle 1.

An annular chamber 21 provided around the main spindle 10 communicates with the hole 17 through a passage 20 provided in the receiver stand 15. The cutting fluid is fed from the feed pipe 16 to the annular chamber 21 through the hole 17 and the passage 20. A plurality of holes 22 through which the annular chamber 21 communicates with the bore 9 allow the cutting fluid to flow into the bore and then into an oil hole provided in the cutting tool (not shown).

One end of a sliding shaft 24 is accommodated in the receiver stand 15. When the cutting tool holder 8 is mounted on the spindle 1, the other end of the sliding shaft 24 fits in the recess 7 and the sliding shaft is pushed back into the receiver stand 15 against the resilience of a spring 23. The clearance at one end of the sliding shaft 24 in the receiver stand 15 is smaller than the clearance at one end of the feed pipe 16 in the oil feed stand 4.

A stopper 26 is integral with the sliding shaft 24. When the cutting tool holder 8 is mounted on the spindle 1, the sliding shaft 24 is pushed back against the resilience of the spring 23 and one end of the stopper 26 is disengaged from a recess 25 provided in the main spindle 10.

In the embodiment shown, two holes 27 are provided in the stopper 26 so as to allow the sliding shaft 24 and the feed pipe 16 to extend therethrough. A screw 28 is screwed into the other end of the stopper 26 to secure the sliding shaft 24 to the stopper 26. The stopper is adapted to be moved together with the sliding shaft independently of the feed pipe 16.

Figure 3:
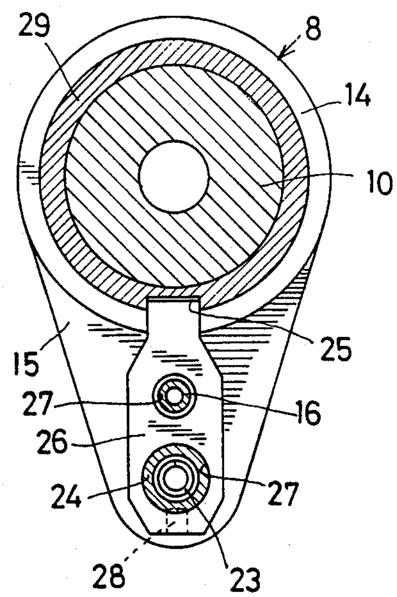
FIG. 3 is a sectional view taken along line III—III of FIG. 1.
Figure 7:
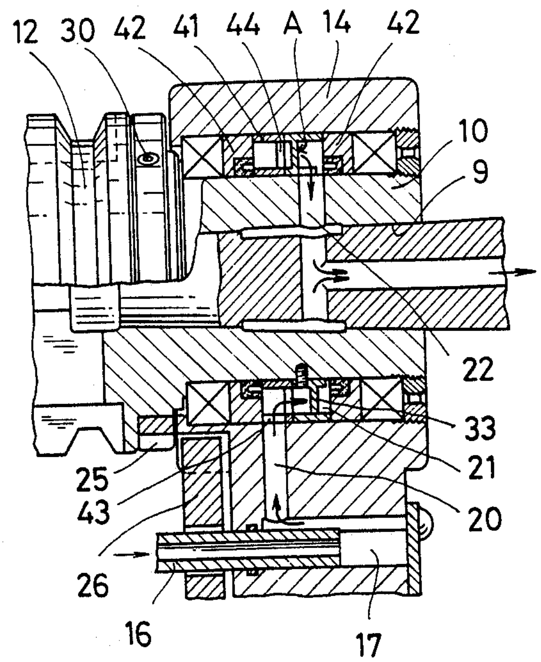
FIG. 7 is a vertical sectional front view of another embodiment of the present invention in which an intensifier in the form of screw-shaped vanes is incorporated.

As shown in FIGS. 1, 3 and 7, a ring 29 with a recess 25 fits on the main spindle 10 and is removably secured thereto by means of screws 30 so that the position of recess will be adjustable. As shown in FIG. 1, the feed pipe 16 and the sliding shaft 24 are chamfered at their end so as to facilitate insertion into the mouth 6 and the recess 7, respectively.

An intensifier A, which takes advantage of the revolution of the main spindle 10 to raise the feed pressure of the cutting fluid, is provided in the course of the feed line for the cutting fluid.

Figure 4:
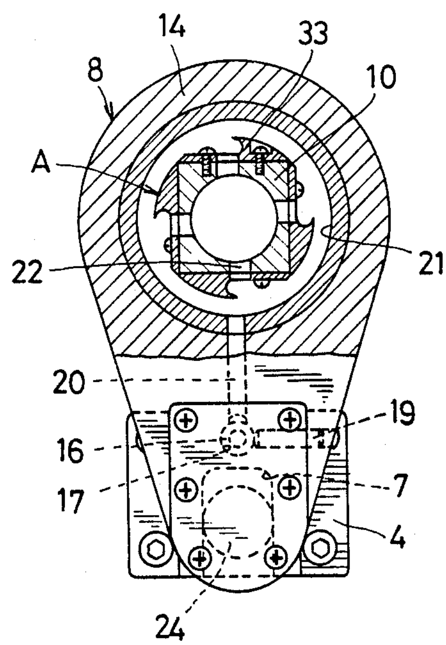
FIG. 4 is a partially cutaway side view thereof.
Figure 5:
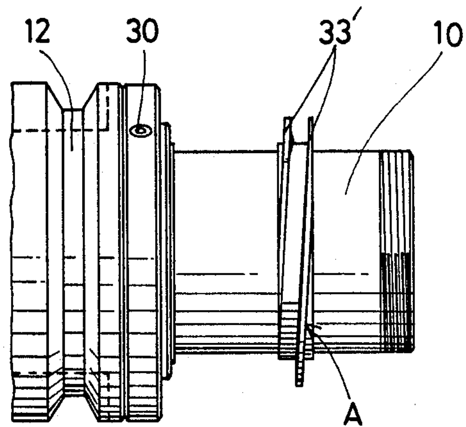
FIGS. 5 and 6 are front views of examples of intensifiers in the form of screw-shaped vanes.
Figure 6:
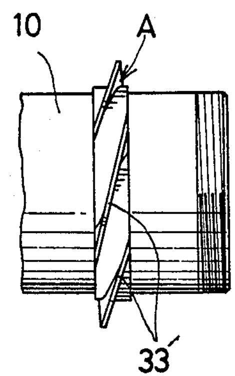

One type of the intensifier A comprises a plurality of claw-shaped vanes 33 (in FIG. 4) or screw-shaped vanes 33' (in FIGS. 5 and 6) mounted on the external surface of the main spindle 10 in the annular chamber 21.

Figure 9:
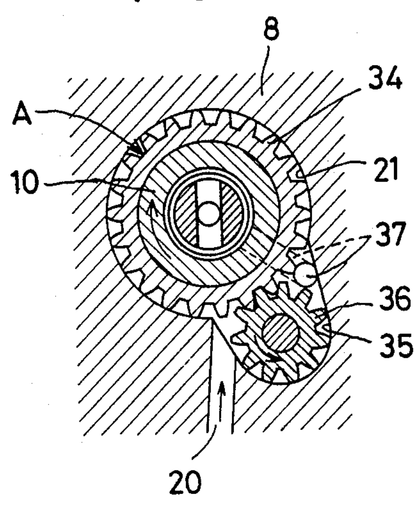
FIG. 9 is a vertical sectional side view of another example of the intensifier in the form of a gear pump.

FIG. 9 shows another type of the intensifier A in the form of a gear pump, comprising a cogwheel 34 fixedly mounted on the external surface of the main spindle 10 in the annular chamber 21, a pinion 36 disposed in a recess 35 provided in the wall of the annular chamber 21 so as to engage the cogwheel 34, and a passage 37 through which the cutting fluid discharged by the engagement of the cogwheel 34 with the pinion 36 is fed to the bore 9.

Figure 10:
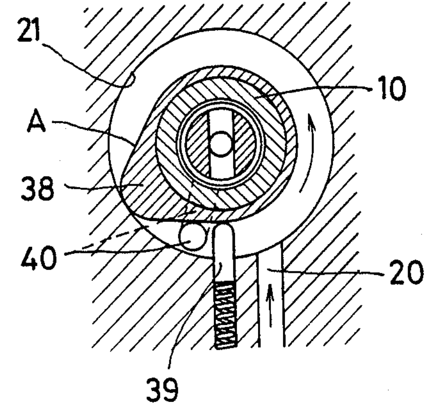
FIG. 10 is a vertical sectional side view of still another example of the intensifier in the form of a rotary pump.

Still another type of the intensifier A shown in FIG. 10 takes the form of a rotary pump, comprising a rotor 38 fixedly mounted on the outer periphery of the main spindle 10 in the annular chamber 21, a partition plate 39 accommodated in a hole provided in the wall of the annular chamber 21 and urged outwardly by a spring into contact with said rotor so as to be free to project from and recede into the hole, and a passage 40 through which the cutting fluid compressed by the rotor 38 is fed from the annular chamber 21 to the bore 9.

Figure 8:
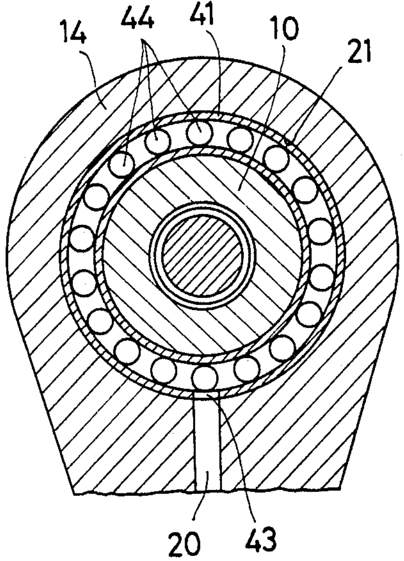
FIG. 8 is a vertical sectional side view thereof.

In the case of the type using the vanes, as shown in FIGS. 7 and 8, an annular member 41 having a channel-shaped section is accommodated in the annular chamber 21 in such a manner that its two flanges extend from its web in a direction opposite to the vanes 33. The annular member 41 is held between a pair of snap rings 42 and secured thereby to the casing 14. The annular member 41 is formed with a hole 43 in its outer flange so as to communicate with the passage 20. A plurality of holes 44 are provided in the web of the annular member 41. Because of this arrangement, the cutting fluid flowing into the annular chamber 21 and fed toward the vanes 33 through the holes 44 is free from centrifugal force acting while the main spindle 10 is revolving.

The intensifiers in the form of a gear pump and the rotary pump can forcedly raise the feed pressure of the cutting fluid without being affected by centrifugal force attendant upon the revolution of the main spindle 10.

The manner in which the vanes 33 are mounted is not limited to the above-mentioned arrangement.

In FIG. 1, an O ring 31 is mounted on the feed pipe 16 to prevent leakage. A blind hole 32 is provided axially in the sliding shaft 24 to accommodate the spring 23.

The holder in accordance with the present invention is of the above-described construction. When the cutting tool holder 8 is stored in a magazine (not shown), the spring 23 urges the sliding shaft 24 so as to allow one end of the stopper 26 to engage in the recess 25. This engagement prevents the casing 14 from turning relative to the main spindle 10. The cutting tool holder 8 is placed in a predetermined position in the magazine by means of a position limiter provided on the magazine and adapted to fit in a recess 12 formed in the cutting tool holder 8.

In operation, the cutting tool holder is grasped by a manipulator (not shown), taken out of the magazine, and carried toward the spindle 1 with the stopper 26 fitting in the recess 25.

Then the shank 11 of the holder 8 is fitted into the tapered hole 3 of the spindle 1. The holder will be held in the spindle by wedge effect. The end of the feed pipe 16 and that of the sliding shaft 24 fit into the mouth 6 and the recess 7, respectively. The stopper 26 moves together with the sliding shaft 24 when the latter is pushed back into the receiver stand 15. Consequently the end of the stopper 26 is disengaged from the recess 25, and the main spindle 10 becomes free to rotate with respect to the casing 14.

The main spindle 10 and the cutting tool mounted thereon revolve with the spindle 1 when the latter is driven. When an oil pump (not shown) is started, the cutting fluid flows through the passage 5, feed pipe 16, passage 20, annular chamber 21 and holes 22, and is discharged from the tip of the revolving cutting tool.

When the holder 8 is removed from the spindle 1 by means of a manipulator, the sliding shaft 24 is pushed out of the receiver stand 15 by the resilience of the spring 23. The stopper 26 advances together with the sliding shaft 24 until its end engages in the recess 25 so as to maintain relative position between the casing 14 and the main spindle 10.

Both a cutting fluid feed line and an air feed line may be connected to the feed stand 4 so that one of them can be connected selectively by means of a selector valve. Air is used for the removal of chips.

The position of the recess 25 in the ring 29 is adjustable with respect to the main spindle 10, and the length for which the feed pipe 16 protrudes from the receiver stand 15 is also adjustable. Also, the position of the stopper 26 is adjustable because it is integral with the sliding shaft 24. This adjustability gives a better interchangeability among different models. This arrangement allows for differences in sizes of the components, and relative position and angle between the components.

The feed pressure of the cutting fluid is raised by the intensifier, taking advantage of the revolution of the main spindle 10. Consequently the cutting fluid fed from the passage 20 to the tip of the cutting tool can have a pressure higher than the delivery pressure of the coolant pump.

This makes possible high-speed cutting without replacing an ordinary low-pressure coolant pump with a high-pressure one. High expense otherwise required to adjust the piping can be dispensed with.

What is claimed is:

1. A holder for a cutting tool comprising a main spindle formed with a bore to receive the cutting tool, a casing mounted on said main spindle, and an oil receiving stand secured to said casing, said main spindle, said casing and said receiving stand being each formed with an oil passage communicating with one another to feed cutting fluid to the cutting tool, characterized in that said oil passge in said main spindle includes an annular chamber extending around the periphery of said main spindle for receiving cutting fluid from said oil passage in said casing and an oil passage in said main spindle for discharging cutting fluid from said annular chamber directly into said bore and an intensifier means in said annular chamber for increasing the feed pressure of said cutting fluid received from said oil passage in said oil receiving stand as the speed of rotation of said main spindle and said tool is increased and for feeding said cutting fluid with said increased feed pressure directly to said spindle bore, said intensifier means including a plurality of vanes mounted on said main spindle and disposed in said chamber for drawing cutting fluid from said oil passage in said casing and for feeding said drawn cutting fluid into said oil passage in said main spindle.

2. A tool holder assembly which comprises, in combination, a tool holder connected to a spindle of a machine for rotation together therewith, a stationary support member rotatably coupled to said tool holder for rotatably supporting the tool holder connected to a fixed portion of the machine, a fluid supply circuit defined in the tool holder for supplying a cutting fluid from an external source thereof toward a fluid discharge passage defined in a cutting tool, said cutting tool being replaceably connected to and carried by the tool holder, and a vane-type displacement pump assembly coupled to said fluid supply circuit comprising a rotor, constituted by a portion of the tool holder, and a pump casing constituted by a portion of the stationary support member and forming an annular chamber axially aligned with said tool holder, said rotor having a first portion off-set relative to the axis of rotation for sweeping the circumferential wall as said tool holder and said rotor are rotated and a second portion spaced from said circumferential wall as said tool holder and said rotor are rotated and spring urged vane means between said rotor and said circumferential wall of said chamber, said vane-type displacement assembly being operable to forcibly pump the cutting fluid, which has been supplied from the external source thereof to the vane-type displacement pump, toward the fluid discharge passage in the cutting tool.

* * * * *